United States Patent
Little

(10) Patent No.: US 8,863,155 B2
(45) Date of Patent: *Oct. 14, 2014

(54) ASSOCIATING RULES WITH MESSAGES AND USING THE RULES FOR MESSAGE PROCESSING

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,623

(22) Filed: May 10, 2013

(65) Prior Publication Data

US 2013/0246573 A1    Sep. 19, 2013

Related U.S. Application Data

(63) Continuation of application No. 11/809,563, filed on May 31, 2007, now Pat. No. 8,443,378.

(51) Int. Cl.
*H04L 12/58* (2006.01)
*G06F 9/54* (2006.01)

(52) U.S. Cl.
USPC .......................................................... 719/318

(58) Field of Classification Search
CPC ............................ H04L 51/08; H04L 12/5855
USPC ......................................... 709/206; 719/318
See application file for complete search history.

(56) References Cited

U.S. PATENT DOCUMENTS

2002/0120692 A1* 8/2002 Schiavone et al. ............. 709/206
2007/0203988 A1* 8/2007 Lee et al. ....................... 709/206

OTHER PUBLICATIONS

Chappell, D., "Enterprise Service Bus" (2004), O'Reilly Media, Inc., pp. 1-247.*

* cited by examiner

*Primary Examiner* — Brian W Wathen
(74) *Attorney, Agent, or Firm* — Lowenstein Sandler LLP

(57) ABSTRACT

A processing device executing a rules engine receives a message with one or more associated rules, wherein each of the one or more associated rules is provided as an attachment to the message or within a body of the message, and wherein each of the one or more associated rules in the received message affect processing of the received message. The rules engine processes the one or more associated rules in the received message, wherein each of the one or more associated rules comprises a conditional element and an action to be performed that affects processing the received message when the conditional element is satisfied. Processing the one or more associated rules comprises, for each associated rule, determining whether the conditional element is satisfied, and responsive to determining that the conditional element is satisfied, performing the action that affects the processing of the received message.

20 Claims, 5 Drawing Sheets

ASSOCIATING RULES WITH MESSAGES AND USING THE RULES FOR MESSAGE PROCESSING

RELATED APPLICATIONS

The present application is a continuation of U.S. patent application Ser. No. 11/809,563, filed May 31, 2007, entitled "Method And Apparatus For Associating Rules With Messages And Using The Rules For Message Processing," which is incorporated by reference herein.

TECHNICAL FIELD

Embodiments of the present invention relate to distributed computing, and more specifically to associating rules with messages in a distributed computing environment.

BACKGROUND

In conventional distributed computing environments that include a service oriented architecture (SOA), messages are passed between and among clients and services. Such messages may be interpreted, and events may be initiated, according to a set of rules. Different rules may operate on messages to achieve different results. For example, when a service receives messages from a first client, it may apply rule A to perform a first action, and when the service receives messages from a second client, it may apply rule B to perform a second action.

Each service and client in a conventional SOA includes those rules that it needs to process messages. Without a necessary rule, a service may not be able to process a received message. Therefore, system administrators need to know in advance what rules will be necessary for each message that is likely to be exchanged in the SOA. These rules are generated and deployed before messages on which the rules will operate are sent. Such rules are statically deployed, meaning that the rules are placed on the clients and/or services until they are deleted or replaced, often by a system administrator.

Rules may need to be modified as new functionality is added, systems are upgraded, business models change, etc. Therefore, the rules at the services and clients periodically need to be replaced or updated. However, it is not always apparent that a rule needs to be updated or replaced. This fact is commonly discovered only once a customer complains about lost functionality.

BRIEF DESCRIPTION OF THE DRAWINGS

The present invention is illustrated by way of example, and not by way of limitation, in the figures of the accompanying drawings and in which.

DETAILED DESCRIPTION

Figure 1:
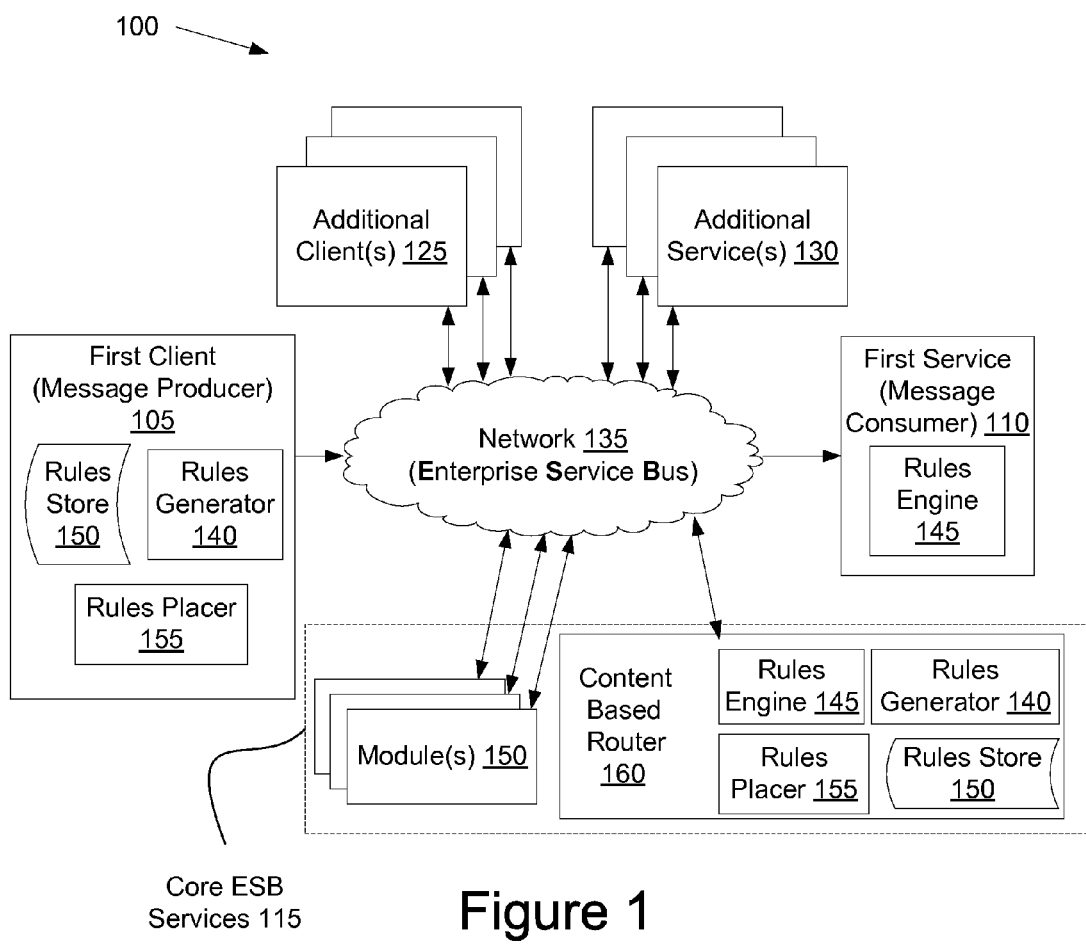
FIG. 1 illustrates an exemplary distributed system, in which embodiments of the present invention may operate.

Described herein is a method and apparatus for using rules in a distributed computing system. In one embodiment, a message is generated. One or more rules are associated with the message. Associating a rule to the message may include attaching the rule to the message and/or including the rule in a body of the message. The rules may be received from a message generator or from a rules store prior to associating them with the message. Each of the one or more rules may pertain to an action to be performed (e.g., by a message consumer). Once the rules have been associated with the message, the message is sent to a destination with the associated rules. The destination may be, for example, a message consumer, or an intermediate location that can be accessed by message consumers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates an exemplary distributed system 100, in which embodiments of the present invention may operate. In one embodiment, the distributed system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed system 100 may include clients (e.g., first client 105 and additional clients 125) and services (e.g., first service 110, additional services 130 and core ESB services 115), connected via a network 135. Each of the clients 105 and 125 and services 110, 115, 130 may be both message producers and message consumers, as described below.

The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based massaging engine that provides services for more complex architectures. The ESB provides an infrastructure that links together services 110, 115, 130 and clients 105 and 125 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients 105 and 125 may be, for example, personal computers (PC), palm-sized computing devices, personal digital assistants (PDA), etc. Clients 105 and 125 may also be applications run on a PC, server, etc. In the SOA, clients 105 and 125 include applications that access services 110 and 130. Clients 105 and 125 may be fat clients (clients that perform local processing and data storage), thin clients (clients that perform minimal or no local processing and minimal to no data storage), and/or hybrid clients (clients that perform local processing but little to no data storage).

In the illustrated embodiment, the first client 105 is a message producer. Alternatively, additional clients 125, first service 110, additional services 130 or core ESB services 115 may be message producers. A message producer is a client or service that generates a message. Messages include data that may cause an action to be performed by (e.g., initiate an event on), or convey information to, a message consumer (e.g., a service or client). A message may be generated for any of a myriad of purposes. For example, the message may be generated to report a purchase of a good, to request contact information, to begin a remote process (e.g., initiate a service), etc.

The message may include a message header having a unique message identifier and routing information (e.g., recipient, sender, message priority, etc.) to identify the message, and to route the message to end points (recipients) intended by the message producer and/or as determined by the ESB (e.g., by a router within the ESB). The message may be directed to a specific endpoint (e.g., a specific client or service), or the message may be posted to an intermediate location, which one or more endpoints may communicate with to receive the message. The message may also include a message context (e.g., custom fields or filters, transactional information, security information, etc.) and a message body. The message body may be formatted using an extensible markup language (XML), a standard generalized markup language (SGML), or other flexible format.

In one embodiment, the message producer (e.g., first client 105) includes a rules generator 140, a rules store 150 and a rules placer 155. Rules generator 140 generates rules that can be processed by a rules engine 145. In one embodiment, the rules are generated in a scripting language (e.g., Perl, JavaScript, Python, Ruby, etc.) or a specific rules language, such as JBoss® Rules. Alternatively, the rules may be generated in a compiled programming language (e.g., C, C++, VisualBasic, etc.), or programming language that combines interpreters (as used in a scripting language) and compilers (as used in a compiled programming language). In one embodiment, rules generator generates appropriate rules each time a message is produced. Appropriate rules may include rules that apply to a particular service or client that the message will be sent to, rules that apply to the type of message that was produced, rules that a user has indicated should be generated, etc. Alternatively, rules generator 140 may generate new rules when needed rules are not present in rules store 150.

A rule is an abstract structure that describes a formal language precisely (e.g., a set of rules that mathematically delineates a (usually infinite) set of finite-length strings over a (usually finite) alphabet). Rules may perform actions, provide information, help process messages, etc. In one embodiment, a rule dictates a transition to be made on a message or message consumer based on a set of criteria. Alternatively, a rule may perform other functions.

A rule may include conditional elements (e.g., and, or, not, exists, etc.), constraints (e.g., equal to, not equal to, greater than, contains, etc.) and consequences or actions (e.g., decrypt message, process next rule, etc.). Examples of rules relating to messages include security rules (e.g., validation, authentication, authorization) to ensure that a message is not used by untrusted endpoints, rules on how to process messages, rules on where to direct messages, etc. For example, a rule could be attached to an encrypted message and only decrypt the message upon receipt of correct credentials from the recipient.

Once generated, a rule may be stored in rules store 150. Rules store 150 may be a storage device such as RAM, a hard disk drive, optical drive, etc. Rules store 150 may include a single storage device, or multiple networked storage devices at the same or different locations. In one embodiment, rules store 150 is located at the message producer (e.g., first client 105). In another embodiment, rules store 150 may be external to the message producer. An external rules store 150 may be a service of the ESB that may be accessed by message producers to retrieve rules. The rules store 150 may include a repository or database of rules in which rules may be managed, organized, searched, etc.

Rules placer 155 associates rules with messages. To determine which rules to associate with which messages, rules placer 155 may analyze the message, and may examine available rules. In one embodiment, rules placer 155 places all newly generated rules on a message. In another embodiment, rules placer 155 searches for appropriate rules in the rules store 150 to place on the message. Rules searched for may include rules that pertain to the type of message, rules that pertain to a client or service to which the message will be sent, rules that a user has indicated should be attached to outgoing messages, etc. In yet another embodiment, a local table is searched that indicates a list of rules to attach to each distinct outgoing message.

In one embodiment, associating a rule with a message includes attaching the rule to the message. Alternatively, associating the rule with the message may include placing the rule in the body of the message. Multiple rules may be associated with a message. Such rules may be interdependent or "strongly coupled" (e.g., second rule only applies if certain conditions are met using first rule), or they may be independent or "loosely coupled" (e.g., the outcome of a first rule does not influence an outcome of a second rule, and vice versa).

Services 110 and 130 may be discretely defined sets of contiguous and autonomous functionality (e.g., business functionality, technical functionality, etc.). Services 110 and 130 may be resident on personal computers (PC), servers, routers, etc. Each service 110 and 130 may represent a process, activity or other resource that can be accessed and used by other services or clients on network 135. Each service 110 and 130 may be independent of other services 110 and 130, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

In the illustrated embodiment, the first service 110 is a message consumer. Alternatively, first client 105, additional clients 125, core ESB services 115 or additional services 130 may be message consumers. A message consumer receives a message generated by a message producer. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc.

In one embodiment, the message consumer (e.g., first service 110) includes a rules engine 145. The rules engine 145 is a logic component that processes rules to produce outcomes. The rules engine 145 may match facts, data and rules, and infer conclusions which may result in actions or events of, for example, a message consumer. In one embodiment, the rules engine 145 matches the facts, data and rules using a Rete Algorithm, as is known to one of ordinary skill in the art. Alternatively, the rules engine may use a Linear Algorithm, Treat Algorithm, Leaps Algorithm, etc. Hybrid algorithms that use combinations of, for example, the Leaps Algorithm and the Rete Algorithm, may also be used.

In one embodiment, the distributed system 100 includes an ESB that has a collection of core ESB services 115. The core ESB services 115 act on messages that flow through the ESB. Messages can also be directed towards any of the core ESB services 115 in the same manner as described above with reference to the first service 110 and additional services 130. Any of the core ESB services 115 may include one or more general purpose computing devices (e.g., personal computer or server) and/or a special purpose computing devices configured to act on messages that flow between message producers (e.g., clients or services) and message consumers (e.g., clients or services) within the ESB.

In one embodiment, the core ESB services 115 include a content based router 160. The content based router 160 is a service of the ESB that monitors the network 135 for messages, and routes the messages between clients and services. The content based router 160 may be transparent to both message producers and message consumers. In one embodiment, the content based router 160 includes a rules generator 140, a rules store 150, a rules engine 145 and a rules processor 155.

The content based router 160 may route all messages that flow through the ESB, or a subset of all messages. In one embodiment, the content based router 160 routes messages according to routing information included in message headers or other parts of the message. In a further embodiment, rules engine 145 determines a destination channel (route to a client or service) based on rules associated with received messages.

Rules generator 140 may generate new rules for the message to be routed by content based router 160. Rules placer 155 may then associate the new rules to the message. Rules placer 155 may also associate rules from the rules store 150 with the message. A determination of which rules to associate with the message may be made by rules engine 145.

The core ESB services 115 may include one or more modules 150, each of which may be a service of the ESB. Examples of modules 150 include modules that provide services for redirecting a message from an original intended endpoint, splitting a message into multiple messages, combining multiple messages into a single message, transforming messages from a first format to a second format, applying rules to a message, etc. Each module 150 may provide a service to clients 105 and 125 and/or services 110 and 130 of the distributed computing system 100.

Figure 2A:
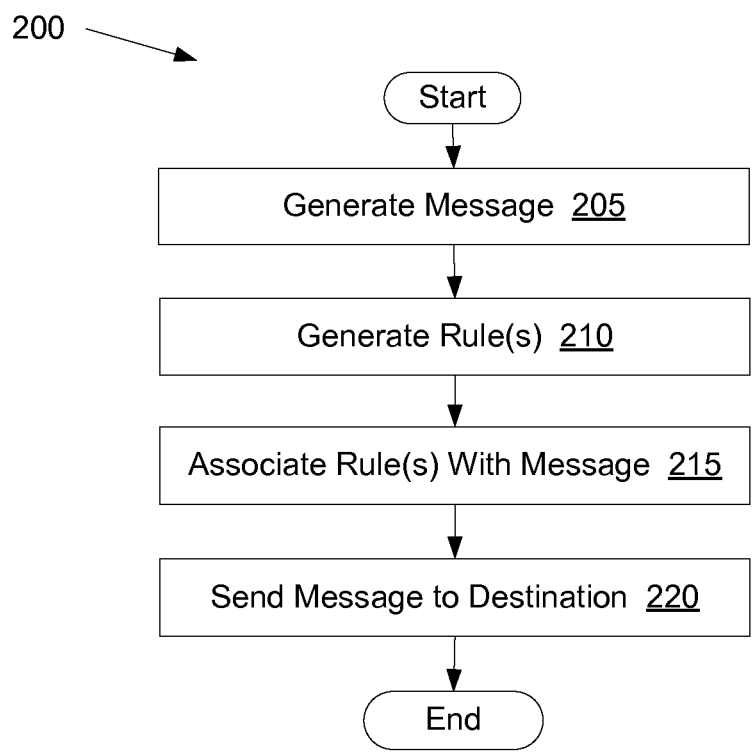
FIG. 2A illustrates a flow diagram of one embodiment for a method of associating rules with messages.

FIG. 2A illustrates a flow diagram of one embodiment for a method 200 of associating rules with messages. The method may be performed by processing logic that may comprise hardware (e.g., circuitry, dedicated logic, programmable logic, microcode, etc.), software (such as instructions run on a processing device), or a combination thereof. In one embodiment, method 200 is performed by a service or client of distributed computing system 100 of FIG. 1.

Referring to FIG. 2A, method 200 begins with processing logic generating a message (block 205). The generated message may include a public part that is readable to anyone, and a private part that may be viewed if certain security rules are satisfied.

At block 210, one or more rules are generated. Each of the rules may cause an action to be performed by a message consumer. The rules may include security rules that secure a private part of the generated message. At block 215, the generated rules are associated to the message. Associating the rule to the message may include attaching the rule to the message, or inserting the rule into a body of the message. Once rules are associated with the message, a header or body of the message may be modified to indicate that the message is associated with rules. For example, information may be added to the header or body of the message that indicates where in the message the rules are located. At block 220, the rule is then sent to a destination.

Figure 2B:
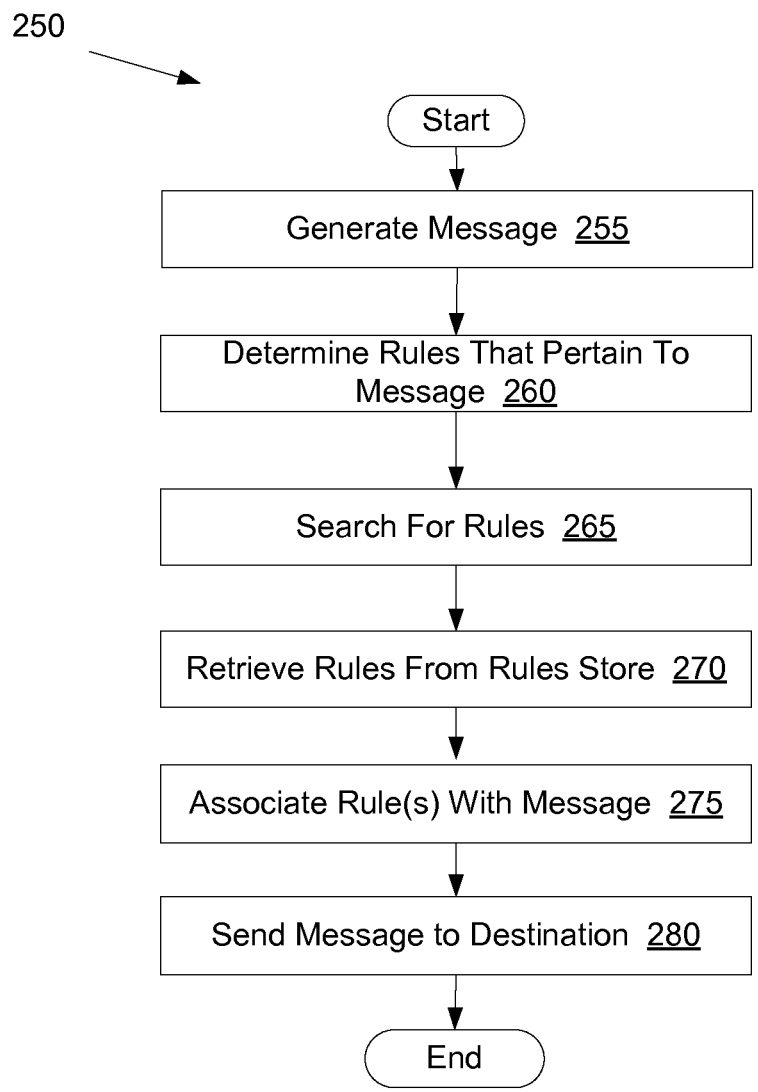
FIG. 2B illustrates a flow diagram of another embodiment for a method of associating rules with messages.

FIG. 2B illustrates a flow diagram of another embodiment for a method 250 of associating rules with messages. The method may be performed by processing logic that may comprise hardware (e.g., circuitry, dedicated logic, programmable logic, microcode, etc.), software (such as instructions run on a processing device), or a combination thereof. In one embodiment, method 250 is performed by a service or client of distributed computing system 100 of FIG. 1.

Referring to FIG. 2B, method 250 begins with processing logic generating a message (block 255). At block 260, processing logic determines what rules pertain to the message. In one embodiment, a local table identifies rules that pertain to the message. Alternatively, each rule may include information identifying what rules it should be associated with. In such an embodiment, it is not determined what rules pertain to the message until a search for rules (block 265) has occurred.

At block 265, the rules that pertain to the message are searched for. In one embodiment, the local table indicates a location on a rules store from which to retrieve the rules. Alternatively, the rules store may be searched for the identified rules. At block 270, the identified rules are retrieved from the rules store.

At block 275, the identified rules are associated with the message. Once rules are associated with the message, a header or body of the message may be modified to indicate that the message is associated with rules. For example, information may be added to the header or body of the message that indicates where in the message the rules are located. At block 280, the rule is then sent to a destination.

Figure 3:
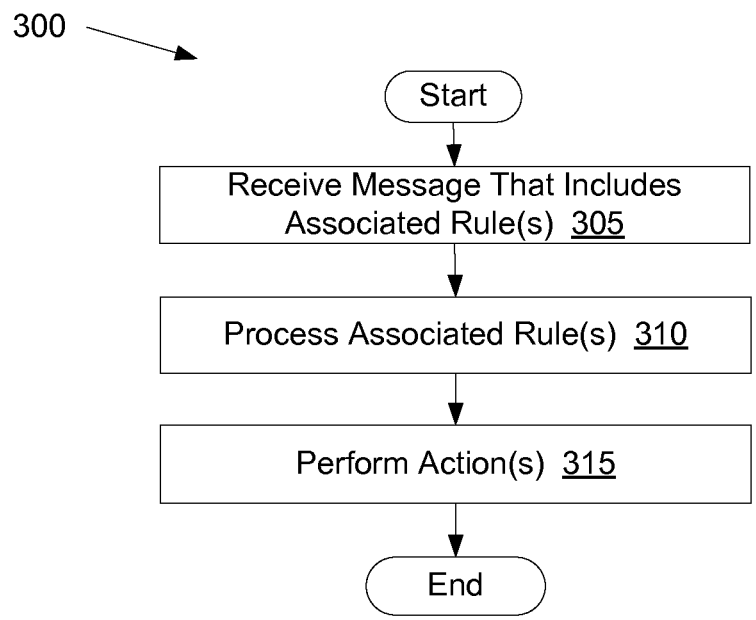
FIG. 3 illustrates a flow diagram of one embodiment for a method of processing a rule associated with a message.

FIG. 3 illustrates a flow diagram of one embodiment for a method 300 of processing a rule associated with a message. The method may be performed by processing logic that may comprise hardware (e.g., circuitry, dedicated logic, programmable logic, microcode, etc.), software (such as instructions run on a processing device), or a combination thereof. In one embodiment, method 300 is performed by a service of distributed computing system 100 of FIG. 1. Alternatively, method 300 may be performed by a content based router or by a message consumer.

Referring to FIG. 3, method 300 begins with processing logic receiving a message that includes an associated rule or rules (block 305). The associated rules may be rules attached to the message, or rules included in a body of the message.

At block 310, the associated rules are processed. The associated rules may be processed by a rules engine. At block 315, one or more actions are performed based on the processed rule or rules. Examples of actions include executing a service, decrypting a private part of the message, storing the message, etc. If the message is received by a core ESB service (e.g., content based router), then the actions may also include, for example, transforming the message from a first format to a second format, copying the message, routing the message or associating additional rules to the message.

Figure 4:
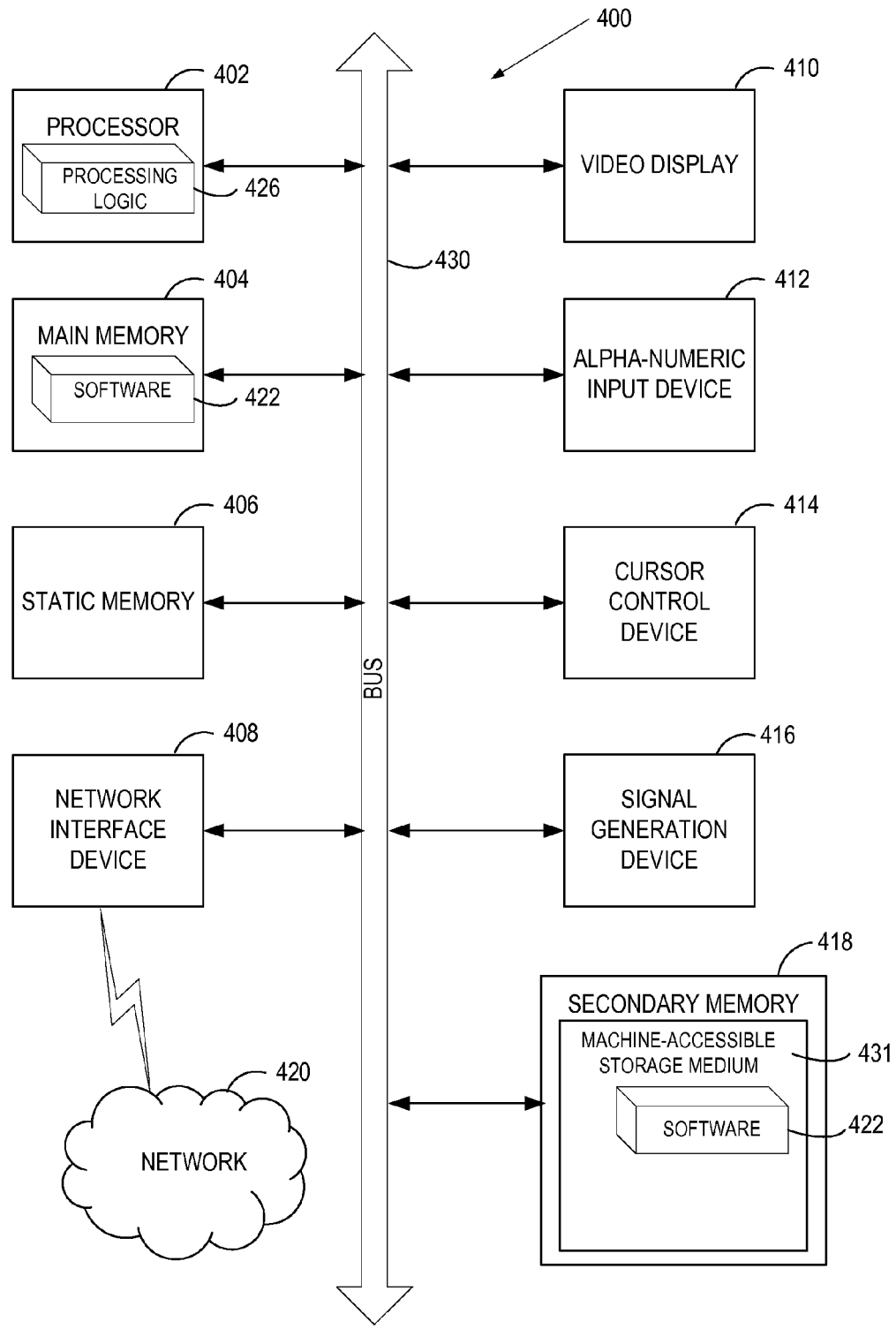
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 431 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404 and the processor 402 also constituting machine-accessible storage media. The software 422 may further be transmitted or received over a network 420 via the network interface device 408.

The machine-accessible storage medium 431 may also be used to store data structure sets that define user identifying states and user preferences that define user profiles. Data structure sets and user profiles may also be stored in other sections of computer system 400, such as static memory 406.

While the machine-accessible storage medium 431 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

receiving, by a processing device executing a content based router that comprises a rules engine, via an enterprise service bus, a message with one or more associated rules, wherein each of the one or more associated rules is provided as an attachment to the message or within a body of the message, wherein each of the one or more associated rules in the received message affect processing of the received message, and wherein the content based router is a service of the enterprise service bus that routes messages between services and clients; and processing, by the processing device, the one or more associated rules in the received message, wherein each of the one or more associated rules comprises a conditional element and an action to be performed that affects processing of the received message when the conditional element is satisfied, and wherein processing the one or more associated rules comprises, for each associated rule:

determining whether the conditional element is satisfied; and responsive to determining that the conditional element is satisfied, performing the action that affects the processing of the received message.

2. The method of claim 1, wherein the one or more associated rules affect whether the message is forwarded and an entity to which the message is forwarded.

3. The method of claim 1, wherein the message comprises a message context, and wherein the message context is used along with the one or more associated rules to produce an outcome.

4. The method of claim 3, wherein the message context comprises at least one of a custom field, a custom filter, transactional information or security information.

5. The method of claim 1, wherein the one or more associated rules comprise at least one of a security rule, a rule specifying how to process the message or a rule specifying where to direct the message.

6. The method of claim 1, wherein the one or more rules comprise a plurality of interdependent rules, wherein an outcome of a first rule of the plurality of interdependent rules influences an outcome of a second rule of the plurality of interdependent rules.

7. The method of claim 1, further comprising:

reading at least one of a header or a body of the message to identify that the message comprises the one or more associated rules.

8. A non-transitory computer readable storage medium having instructions that, when executed by a processing device, cause the processing device to perform operations comprising:

receiving a message with one or more associated rules, wherein each of the one or more associated rules is provided as an attachment to the message or within a body of the message, and wherein each of the one or more associated rules in the received message affect processing of the received message, wherein the one or more associated rules comprise a plurality of interdependent rules, wherein an outcome of a first rule of the plurality of interdependent rules influences an outcome of a second rule of the plurality of interdependent rules;

processing, by a rules engine executed by the processing device, the one or more associated rules in the received message, wherein each of the one or more associated rules comprises a conditional element and an action to be performed that affects processing of the received message when the conditional element is satisfied, and wherein processing the one or more associated rules comprises, for each associated rule:

determining whether the conditional element is satisfied; and responsive to determining that the conditional element is satisfied, performing the action that affects the processing of the received message.

9. The non-transitory computer readable storage medium of claim 8, wherein the message is received by the processing device via an enterprise service bus, and wherein the processing device executes a content based router that comprises the rules engine, the content based router being a service of the enterprise service bus that routes messages between services and clients.

10. The non-transitory computer readable storage medium of claim 9, wherein the one or more associated rules affect whether the message is forwarded and an entity to which the message is forwarded.

11. The non-transitory computer readable storage medium of claim 8, wherein the message comprises a message context, and wherein the message context is used along with the one or more associated rules to produce an outcome.

12. The non-transitory computer readable storage medium of claim 11, wherein the message context comprises at least one of a custom field, a custom filter, transactional information or security information.

13. The non-transitory computer readable storage medium of claim 8, wherein the one or more associated rules comprise at least one of a security rule, a rule specifying how to process the message or a rule specifying where to direct the message.

14. The non-transitory computer readable storage medium of claim 8, the operations further comprising:

reading at least one of a header or a body of the message to identify that the message comprises the one or more associated rules.

15. A computing device comprising:

a memory; and a processing device, coupled to the memory, to:

receive a message with one or more associated rules, wherein each of the one or more associated rules is provided as an attachment to the message or within a body of the message, and wherein each of the one or more associated rules in the received message affect processing of the received message, wherein the one or more associated rules comprise a plurality of interdependent rules, wherein an outcome of a first rule of the plurality of interdependent rules influences an outcome of a second rule of the plurality of interdependent rules; and execute a rules engine to process the one or more associated rules in the received message, wherein each of the one or more associated rules comprises a conditional element and an action to be performed that affects processing of the received message when the conditional element is satisfied, and wherein processing the one or more associated rules comprises, for each associated rule:

determining whether the conditional element is satisfied; and responsive to determining that the conditional element is satisfied, performing the action that affects the processing of the received message.

16. The computing device of claim 15, wherein the message is received by the computing device via an enterprise service bus, wherein the processing device executes a content based router that comprises the rules engine, the content based router being a service of the enterprise service bus that routes messages between services and clients, and wherein the one or more associated rules affect whether the message is forwarded and an entity to which the message is forwarded.

17. The computing device of claim 15, wherein the message comprises a message context that comprises at least one of a custom field, a custom filter, transactional information or security information, and wherein the message context is used along with the one or more associated rules to produce an outcome.

18. The computing device of claim 15, wherein the processing device is further to:

read at least one of a header or a body of the message to identify that the message comprises the one or more associated rules.

19. The computing device of claim 15, wherein the message comprises a message context, and wherein the message context is used along with the one or more associated rules to produce an outcome.

20. The computing device of claim 15, wherein the one or more associated rules comprise at least one of a security rule, a rule specifying how to process the message or a rule specifying where to direct the message.

* * * * *